United States Patent
Iwata et al.

(10) Patent No.: US 9,341,013 B2
(45) Date of Patent: May 17, 2016

(54) AUTOMATIC DOOR SENSOR DEVICE

(71) Applicant: OPTEX CO., LTD., Shiga (JP)

(72) Inventors: Yohei Iwata, Shiga (JP); Masanao Shiraishi, Shiga (JP); Takayasu Ikeda, Shiga (JP); Takashi Kondo, Shiga (JP)

(73) Assignee: OPTEX CO., LTD., Shiga (JP)

( * ) Notice: Subject to any disclaimer, the term of this patent is extended or adjusted under 35 U.S.C. 154(b) by 0 days.

(21) Appl. No.: 14/470,073

(22) Filed: Aug. 27, 2014

(65) Prior Publication Data

US 2015/0059248 A1 Mar. 5, 2015

(30) Foreign Application Priority Data

Aug. 29, 2013 (JP) .................... 2013-177889

(51) Int. Cl.
*E05F 15/20* (2006.01)
*E05F 15/00* (2015.01)
*E05F 15/40* (2015.01)
*E05F 15/73* (2015.01)
*E05F 15/10* (2006.01)

(52) U.S. Cl.
CPC ......... *E05F 15/0026* (2013.01); *E05F 15/0004* (2013.01); *E05F 15/10* (2013.01); *E05F 15/40* (2015.01); *E05F 15/73* (2015.01); *E05F 2015/0034* (2013.01); *E05F 2015/0043* (2013.01); *E05Y 2900/132* (2013.01)

(58) Field of Classification Search
CPC .... E05F 15/0026; E05F 15/10; E05F 15/0004
USPC ............................................................ 49/25
See application file for complete search history.

(56) References Cited

U.S. PATENT DOCUMENTS

| 4,029,176 | A | * | 6/1977 | Mills .............................. 187/317 |
| 4,967,083 | A | * | 10/1990 | Kornbrekke et al. ........ 250/341.7 |
| 5,001,557 | A | * | 3/1991 | Begle ............................. 348/166 |
| 6,225,904 | B1 | | 5/2001 | Jaffe et al. |
| 6,678,999 | B2 | * | 1/2004 | Zengguang et al. ............... 49/25 |
| 6,782,660 | B2 | * | 8/2004 | Takada et al. ...................... 49/25 |

(Continued)

FOREIGN PATENT DOCUMENTS

| EP | 0 935 042 A2 | 8/1999 |
| JP | 2004-239755 A | 8/2004 |

OTHER PUBLICATIONS

The extended European Search Report issued by the European Patent Office on Feb. 4, 2015, which corresponds to European Patent Application No. 14182664.4-1607 and is related to U.S. Appl. No. 14/470,073.

*Primary Examiner* — Jerry Redman
(74) *Attorney, Agent, or Firm* — Studebaker & Brackett PC

(57) ABSTRACT

There is provided an automatic door sensor device (1) capable of preventing a door (3) which is transitioning from an open position to a closed position from being erroneously detected as an object by temporarily changing a detection area (A, C2, C3). The automatic door sensor device (1) includes a doorway area sensor (7a) that detects the presence of an object in a doorway area (B) which includes at least a portion of an area defined by the path of a door (3), detectors (6, 7b) that detect the presence and/or the movement of an object in changeable detection areas (A, C2, C3), and a detection area changer (31) that changes the detection areas (A, C2, C3) when it is determined, by using the doorway area sensor (7a), that the door (3) is transitioning from an open position to a closed position.

8 Claims, 6 Drawing Sheets

(56) References Cited

U.S. PATENT DOCUMENTS

| | | | |
|---|---|---|---|
| 6,970,085 B2* | 11/2005 | Okabe et al. | 340/545.6 |
| 7,045,764 B2* | 5/2006 | Beggs et al. | 250/221 |
| 7,064,666 B2* | 6/2006 | Sasaki et al. | 340/545.3 |
| 7,154,112 B2* | 12/2006 | Eubelen | 250/559.31 |
| 7,495,556 B2* | 2/2009 | Eubelen et al. | 340/552 |
| 8,077,034 B2* | 12/2011 | Borlez et al. | 340/552 |
| 8,875,441 B2* | 11/2014 | Agam et al. | 49/28 |
| 8,904,708 B2* | 12/2014 | Zacchio et al. | 49/25 |
| 2001/0030689 A1* | 10/2001 | Spinelli | 348/155 |
| 2003/0122514 A1* | 7/2003 | Mercier et al. | 318/280 |
| 2004/0160318 A1 | 8/2004 | Sasaki et al. | |
| 2006/0162254 A1* | 7/2006 | Imai et al. | 49/26 |
| 2006/0203615 A1* | 9/2006 | Gal et al. | 367/98 |
| 2008/0022596 A1* | 1/2008 | Boerger et al. | 49/31 |
| 2010/0319256 A1* | 12/2010 | Agam et al. | 49/31 |

\* cited by examiner

AUTOMATIC DOOR SENSOR DEVICE

CROSS REFERENCE TO THE RELATED APPLICATION

This application is based on and claims Convention priority to Japanese patent application No. 2013-177889, filed Aug. 29, 2013, the entire disclosure of which is herein incorporated by reference as a part of this application.

BACKGROUND OF THE INVENTION

1. Field of the Invention

The present invention relates to an automatic door sensor device that detects an object to control opening and closing of a door.

2. Description of Related Art

In general, a microwave sensor is often used for detecting the entry of an object such as a human body into a detection area. As a result of this detection, an automatic door is opened. In order to ensure the safety of an area on the track of the door or on the path of movement of the door, an infrared sensor is used to detect an object in a doorway area which includes at least a portion of the area defined by the path of the door, and the door is kept open until the object leaves the doorway area.

In the automatic door sensor device, the microwave sensor may erroneously recognize the closing door as a moving object in the case that the detection area of the microwave sensor overlaps with the area on the track of the door. In order to prevent the object from being jammed in the door, the automatic door sensor device tries to open the door even though no object is present in the area on the track of the door because the closing door has been detected as an object. For the purpose of preventing such a malfunction, the detection area of the microwave sensor is usually defined so as not to overlap with the area on the track of the door (e.g., see Japanese Unexamined Patent Application Publication No. 2004-239755).

However, the detection area of the microwave sensor, or in other words, the limit within which an object can be detected by the microwave sensor cannot be readily perceived. For this reason, the detection direction of the microwave sensor is set outward away from the area on the track of the door in order to ensure that the detection area of the microwave sensor will not overlap with the area on the track of the door.

On the other hand, a microwave sensor that uses the Doppler effect and an infrared sensor employ different object detection techniques, and therefore, only one of these sensors may be able to detect an object in some circumstances. For this reason, it is desirable that the detection area of the microwave sensor is close to or overlaps with the doorway area, and consequently overlaps with the detection area of the infrared sensor, which covers the area in the vicinity of the doorway or the area vertically above the track of the door. Accordingly, it is desirable not only to prevent erroneous detection while the door is transitioning from an open position to a closed position, but also to make these detection areas overlap.

Further, in the event that a transom that supports the door sways while the door is transitioning from an open position to a closed position, the infrared sensor mounted on the transom may malfunction and the automatic door sensor device may try to open the door in order to prevent an object from being jammed in the door, even though there is no object in the area. If the infrared sensor is configured in terms of preventing this malfunction, the infrared sensor would fail to detect an object in a normal detection operation.

Therefore, an object of the present invention is to provide an automatic door sensor device capable of preventing erroneous detection of the door transitioning from an open position to a closed position as an object by temporality changing the detection area.

DISCLOSURE OF THE INVENTION

In order to achieve the above object, an automatic door sensor device according to one aspect of the present invention is an automatic door sensor device that is supported by a support member and detects an object to control opening and closing of a door, including: a doorway area sensor that detects the presence of an object in a doorway area which includes at least a portion of an area defined by the path of the door; a detector that detects the presence and/or the movement of an object in a changeable detection area; and a detection area changer that changes the detection area when it is determined, by using the doorway area sensor, that the door is transitioning from an open position to a closed position.

According to this configuration, it is possible, by changing the detection area, to prevent erroneous detection of the movement of the door and erroneous detection resulting, for example, from the swaying of the support member on which the door is mounted. In particular, erroneous detection is prevented by temporarily changing the detection area while the door is transitioning from an open position to a closed position, whereas the detection area is normally defined so as not to fail to detect an object.

Here, the term "detection area" refers to the area within which the detector is able to determine that an object is present when detecting the presence of the object, or refers to the area within which the detector is able to determine that an object is moving when detecting the movement of the object.

The term "change of the detection area" encompasses not only the change of the range of the detection area, but also the change of the detection sensitivity in the detection area.

In a preferred embodiment, the detector may include a moving object sensor that detects the movement of an object in a moving object detection area, and the detection area changer includes a moving object detection area changer that changes the moving object detection area from a first moving object detection area to a second moving object detection area that is different from the first moving object detection area when it is detected that the door is transitioning from the open position to the closed position. The first moving object detection area is allowed to be defined so as to overlap with the area on the track of the door. The second moving object detection area is defined so as not to overlap with the area on the track of the door.

According to this configuration, the first moving object detection area serving as the normal detection area is allowed to be set to a range including the area on the track of the door, and it is therefore not necessary to set the detection direction of the moving object sensor outward away from the area on the track of the door. Accordingly, the moving object detection area can be overlapped with the area on the track of the door, thus improving the reliability of detection especially when different detection methods are used for the moving object sensor and the doorway area sensor. On the other hand, when it is determined, by using the doorway area sensor, that the door is transitioning from an open position to a closed position, the moving object detection area is changed so as to be changed to the second moving object detection area. Since the second moving object detection area does not overlap with the area on the track of the door, it is possible to avoid erroneously detecting the door that is transitioning from an open position to a closed position as the movement of an object.

According to a further preferred embodiment, the moving object sensor may include a moving object detection determiner that compares a magnitude of a detection signal with a changeable detection signal threshold, and determines the movement of an object in the moving object detection area if the magnitude of the detection signal exceeds the changeable detection signal threshold. The moving object detection area of the moving object sensor is dependent on the changeable detection signal threshold. Further, the moving object detection area changer may change the moving object detection area from the first moving object detection area to the second moving object detection area by switching the changeable detection signal threshold from a first detection signal threshold to a second detection signal threshold that is greater than the first detection signal threshold.

Since the moving object detection area of the moving object sensor is changed by only changing the threshold of the detection signal, the moving object detection area can be switched by a simple process.

According to a further preferred embodiment, the moving object sensor further includes: an emitter that emits a radiation wave; a receiver that receives a reflected wave from the object irradiated with the radiation wave emitted by the emitter; and a detection signal obtainer that obtains the detection signal from the radiation wave emitted by the emitter and the reflected wave received by the receiver.

Preferably, the moving object sensor may include a microwave sensor that uses Doppler effect.

The detector may include an object detection sensor that detects the presence of an object in an object detection area. The object detection sensor is mounted on the support member. The detection area changer may include an object detection sensor sensitivity changer that changes the detection area by decreasing a detection sensitivity of the object detection sensor when it is determined that the door is transitioning from the open position to the closed position.

According to this configuration, even if the support member of the door sways while the door is transitioning from an open position to a closed position, it is possible to prevent erroneous detection resulting from that swaying.

Preferably, the object detection sensor may include an infrared sensor. The object detection area is defined in the vicinity of the door.

According to a preferred embodiment, when a predetermined period has elapsed after the detection area is changed upon determination that the door is transitioning from the open position to the closed position, the detection area changer returns the changeable detection area to the detection area before the change. According to this configuration the detection area is changed temporarily, and thus reliable detection can be performed in a normal state.

Preferably, the predetermined period is a time during which the door transitions from an open position to a closed position.

Preferably, the detection that the door is transitioning from the open position to the closed position is performed by the doorway area sensor detecting the presence of an object in the doorway area after a predetermined condition has occurred. An object detected in the doorway area is highly likely to be the door if a predetermined condition has occurred before the detection. Accordingly, it is possible to reliably recognize that the door is transitioning from an open position to a closed position. In other words, an object in the doorway area is recognized as the door only after a condition that occurs before the door transitions from an open position to a closed position has occurred.

More preferably, the predetermined condition may be a condition where the detector and the doorway area sensor detect no object. This condition necessarily occurs before the door transitions from an open position to a closed position because a condition where none of the sensors detect an object occurs immediately before the door transitions from an open position to a closed position after a human body or the like passes through the door. Accordingly, if an object is detected in the doorway area after this condition has occurred, it is possible to reliably determine that the door is transitioning from an open position to a closed position.

Any combination of at least two feature, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, an automatic door sensor device according to a first embodiment of the present invention will be described with reference to the drawings.

Figure 1:
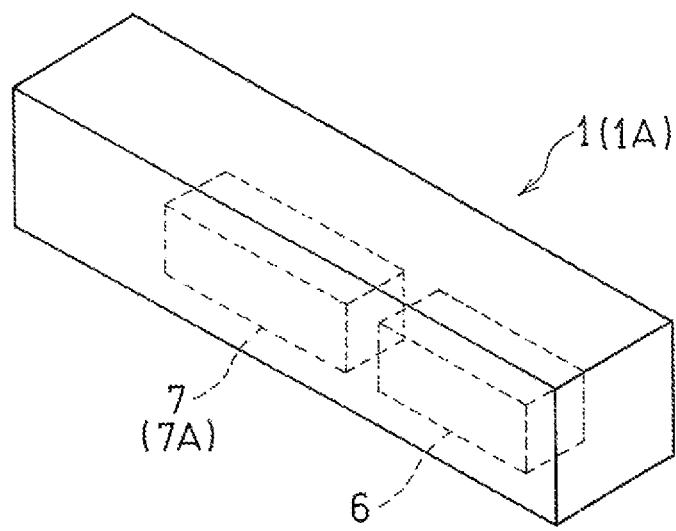
FIG. 1 is a schematic perspective view of an automatic door sensor devices according to first and second embodiments of the present invention.
Figure 2:
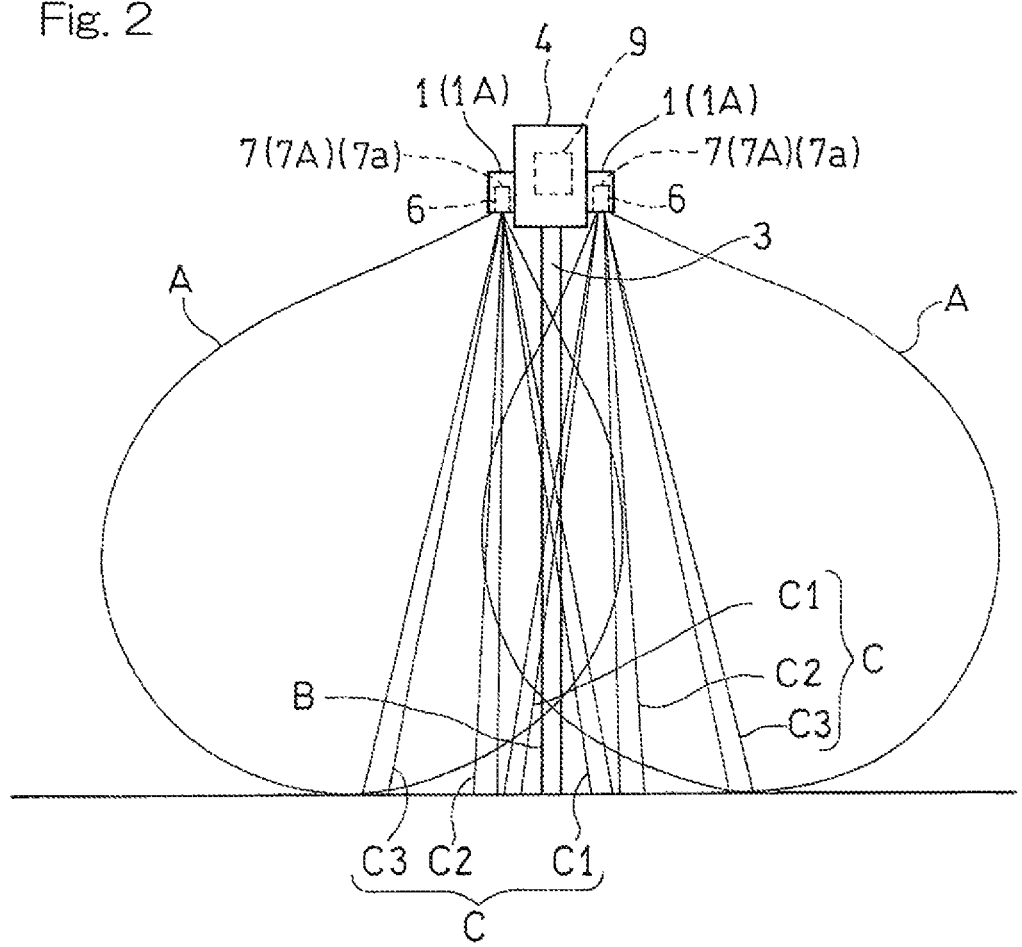
FIG. 2 is a side view showing the automatic door sensor device in FIG. 1 and detection areas thereof.

FIGS. 1 and 2 show the automatic door sensor device according to the first embodiment of the present invention and detection areas thereof. The automatic door sensor device 1 according to the present embodiment shown in FIG. 1 is attached, for example, to the inner-side face and the outer-side face of a transom (support member) 4 supporting the upper end of a sliding automatic door 3 shown in FIG. 2. The device 1 detects an object, so that opening and closing of the automatic door 3 are selectively controlled. The automatic door sensor devices 1, 1 are connected to a controller 9 of a door engine (not shown) accommodated within the transom 4. These two automatic door sensor devices 1, 1 are substantially identical, and therefore, only one of the sensors will be described in the following. It should be noted that the automatic door sensor device 1 may be attached to only one of the inner-side and outer-side faces of the transom 4.

The automatic door sensor device 1 is a sensor device having combined functions. In particular, the sensor device 1 includes an activation sensor 6 and a safety sensor 7. In the present embodiment, the activation sensor 6 includes a microwave sensor using the Doppler effect while the safety sensor 7 includes an active type infrared (AIR) sensor. The activation sensor 6 functions as a moving object sensor, and detects the movement of an object such as a human body in an activation detection area (moving object detection area) A. Thus, the activation sensor 6 detects that the object approaches the automatic door 3, and outputs an instruction signal to the controller 9 that is necessary to open the automatic door 3. In the present embodiment, the activation sensor 6 functions as a detector.

The safety sensor 7 detects the presence of an object such as a human body in a safety detection area C including a doorway area C1 which includes at least a portion of an area B vertically above the door track. That is, the area B is defined by the path of movement of the door 3. Thus, the safety sensor 7 detects the presence of the object in the vicinity of the automatic door 3, and outputs an instruction signal to the controller 9 that is necessary to open the automatic door 3 to prevent the object from being jammed in the automatic door 3. The safety detection area C is defined in the vicinity of the door 3 while the activation detection area A is distant from the door 3.

As described above, the "doorway area" includes at least a portion of the area B defined by the path of the door 3. That is, the doorway area overlaps the area B. In particular, the doorway area may cross the area B, or may terminate within the area B.

Figure 3:
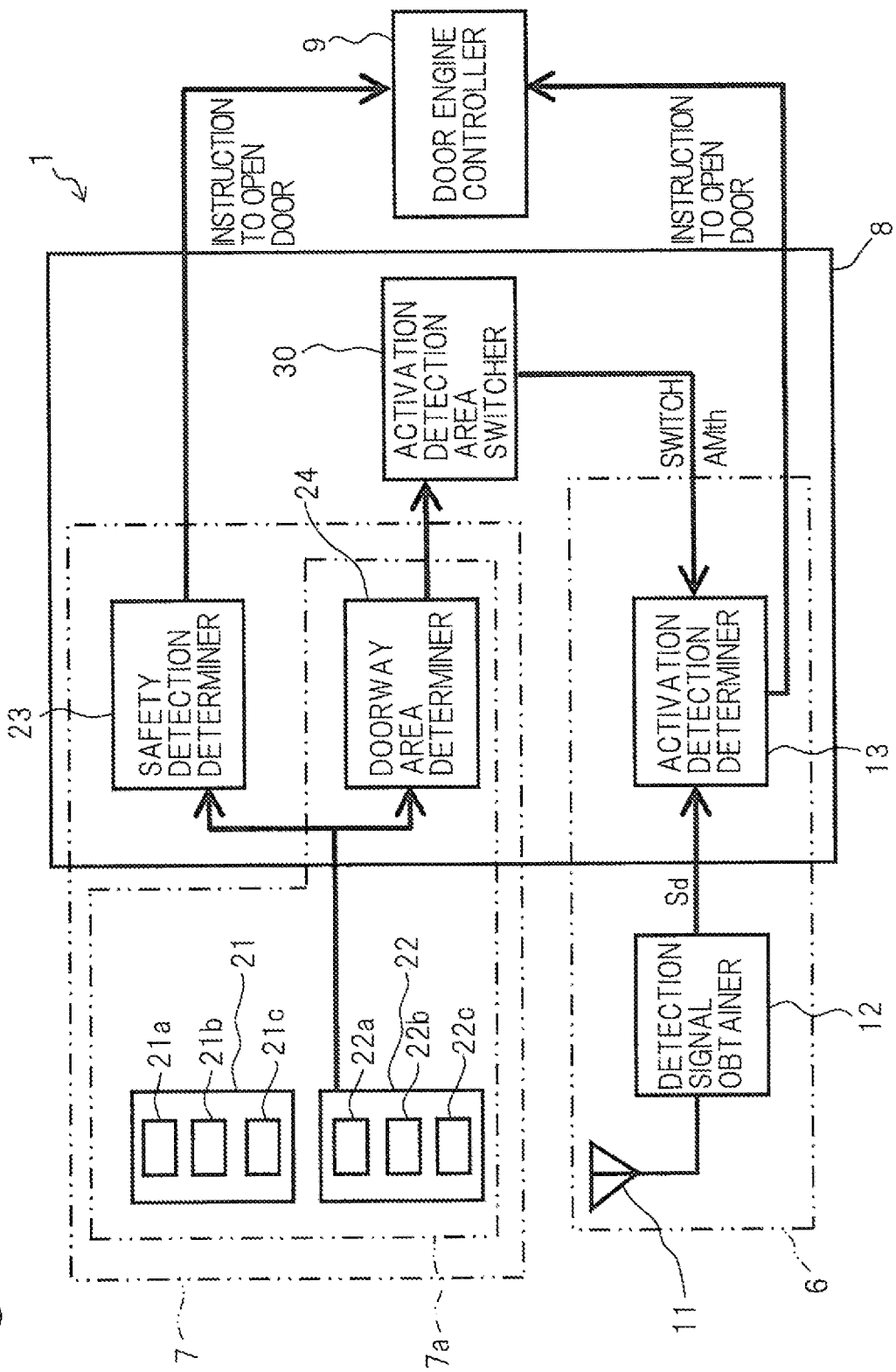
FIG. 3 is a schematic block diagram of the automatic door sensor device according to the first embodiment of the present invention.

FIG. 3 shows the automatic door sensor device 1 according to the present embodiment. It should be noted, however, that only components of the automatic door sensor device 1 that are necessary for the description are illustrated, and the other components are omitted.

The activation sensor 6 includes an antenna 11 that emits a radiation wave constituted by a microwave and receives reflected radiation wave that is reflected by an object or the like. Thus, the antenna 11 functions as an emitter and a receiver.

The activation sensor 6 includes a detection signal obtainer 12 that obtains a detection signal from the radiation wave emitted by the antenna 11 and the reflected wave received by the antenna 11. More specifically, the frequency of the wave reflected by the moving object changes owing to the Doppler effect, and thus the detection signal obtainer 12 obtains a difference signal (detection signal) $S_d$ having a frequency corresponding to a difference between the frequencies of the radiation wave and the reflected wave.

The activation sensor 6 also includes an activation detection determiner 13 in a processing circuit 8. The activation detection determiner 13 compares the amplitude (magnitude) AM of the detection signal $S_d$ obtained by the detection signal obtainer 12 with a switchable detection signal threshold $AM_{th}$, and determines that an object is detected in the activation detection area A (FIG. 2) if the amplitude AM is greater than the switchable detection signal threshold $AM_{th}$, or in other words, if $AM>AM_{th}$ is satisfied. Thus, the activation sensor 6 determines that an object is detected as a result of detecting an object moving in the activation detection area A (FIG. 2). In other words, the activation sensor 6 detects the movement of an object such as a human body, and outputs an instruction signal to the controller 9 that is necessary to open the automatic door 3 (FIG. 2).

The safety sensor 7 is provided with a plurality of beam projector elements 21 (in the present embodiment, first to third beam projector elements 21a, 21b, and 21c) that project light beam downward, and a plurality of beam receiver elements 22 (in the present embodiment, first to third beam receiver elements 22a, 22b, and 22c) that receive reflected light beam travelling from below. The safety sensor 7 detects an object in the safety detection area C (in the present embodiment, a group of first to third safety detection area portions C1, C2, and C3) shown in FIG. 2 by using the beam projector elements 21 and the beam receiver elements 22 as a whole. Here, the first safety detection area portion C1 of the safety detection area C corresponds to a doorway area extending from the automatic door sensor device 1 toward the door 3, and crosses the area B on the door track or the path of movement of the door 3.

The safety sensor 7 in FIG. 3 includes a safety detection determiner 23 in the processing circuit 8 of the automatic door sensor device 1. The safety detection determiner 23 determines that an object is detected in the safety detection area C in FIG. 2, based on the amount of light received by the beam receiver elements 22 (22a, 22b, and 22c), or in other words, based on the amount of received light with respect to that when no object is present as a reference. Thus, the safety detection determiner 23 detects the presence of an object such as a human body, and outputs an instruction signal to the controller 9 that is necessary to open the automatic door 3.

The safety sensor 7 includes a doorway area sensor portion 7a in FIG. 3 that detects an object in the doorway area C1 of the safety detection area C. Thus, the doorway area sensor portion 7a functions as a doorway area sensor. The doorway area sensor portion 7a includes the beam projector elements 21 and the beam receiver elements 22, and further includes, in the processing circuit 8, a doorway area determiner 24 that determines that an object in the doorway area C1 (FIG. 2) is detected.

Next, the detection area A will be described below in detail with reference to FIGS. 4 and 5. It should be noted that for the sake of convenience of description, only one automatic door sensor device 1 is shown.

Figure 4:
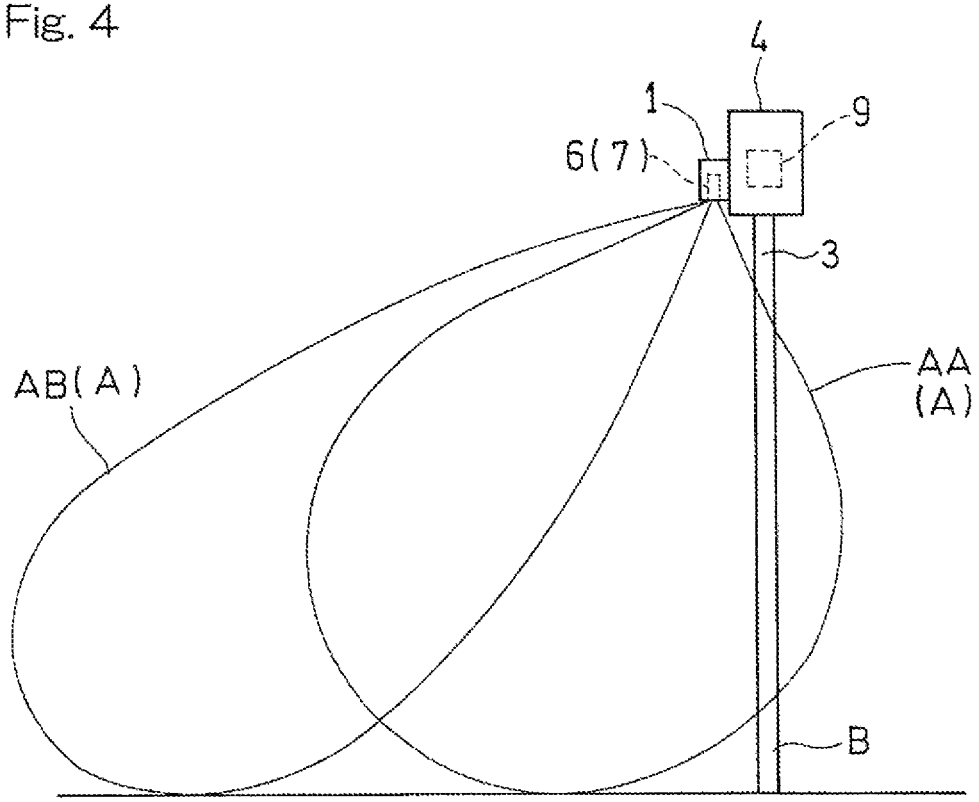
FIG. 4 is a side view showing the automatic door sensor device in FIG. 1 and detection areas of an activation sensor thereof in different directions.

Referring to FIG. 4, when the automatic door sensor device 1 is mounted on the transom 4, the microwave emission direction is adjusted through a microwave angle adjuster (not shown), and the direction of the activation detection area A, within which area the activation sensor 6 detects an object, is fixed. The activation detection area A can be configured to a close detection area AA that is close to or overlaps with the area B on the door track, and also can be configured to a spaced detection area AB that is spaced apart from the area B on the door track.

In a conventional automatic door sensor device the close detection area AA overlapping with the area B on the door track can be selected as the activation detection area A. In such a case, the automatic door sensor device may detect the door that is closing as the movement of an object, and open the door in order to prevent the object from being jammed in the door, or in other words, malfunction occurs. In view of this, with the conventional automatic door sensor device, the setting of the microwave angle adjuster is restricted such that the activation detection area A does not overlap with the area B on the door track, or in other words, such that the spaced detection area AB is selected as the activation detection area A, rather than the close detection area AA.

In contrast, the automatic door sensor device 1 according to the present embodiment does not pose any limitation on the overlapping of the normal activation detection area A with the area B on the door track, and allows the activation detection area A to be defined so as to include the area B on the door track. As shown in FIG. 5, the activation detection area A is switchable. Although the activation detection area A is normally set to a first activation detection area (first moving object detection area) A1, when the automatic door 3 is transitioning from an open position to a closed position, a process is executed such that the activation detection area A is switched to a second activation detection area (second moving object detection area) A2 that is within the first activation detection area A1. Here, the first activation detection area A1 is allowed to be defined so as to include the area B on the door track, whereas the second activation detection area A2 is defined so as not to include the area B on the door track.

To switch between the first activation detection area A1 and the second activation detection area A2, the automatic door sensor device 1 of the present embodiment further includes an activation detection area switcher (moving object detection area changer) 30 in the processing circuit 8 in FIG. 3. When it is detected, by using the doorway area sensor portion 7a of the safety sensor 7, that the automatic door 3 in FIG. 5 is transitioning from an open position to a closed position, the activation detection area switcher 30 switches the activation detection area A from the first activation detection area A1 to the second activation detection area A2. In the present embodiment, the activation detection area switcher 30 functions as a detection area changer.

Specifically, when the doorway area sensor portion 7a in FIG. 2 detects the presence of an object in the doorway area C1 after a predetermined condition has occurred, it is determined that the automatic door 3 is transitioning from an open position to a closed position. The predetermined condition may be, for example, a condition where the activation sensor 6 detects no movement of an object in the activation detection area A, and at the same time, the safety sensor 7 detects no presence of an object in the safety detection area C. The reason that the predetermined condition is defined in this way is as follows: a condition where neither of the sensors 6 and 7 detects an object occurs immediately before the automatic door 3 transitions from an open position to a closed position after a human body or the like has passed through the doorway, so that any object detected in the doorway area C1 immediately thereafter is highly likely to be the moving automatic door 3. Even if the doorway area sensor portion 7a detects an object in the doorway area C1 after the predetermined condition has occurred, the detected object is not recognized as an object for which opening of the door is required, and therefore an instruction signal is not outputted to the controller 9.

The switching of the activation detection area A (FIG. 5) by the activation detection area switcher 30 in FIG. 3 is performed by the activation detection determiner 13 switching the detection signal threshold $AM_{th}$ used for making comparison with the amplitude (magnitude) AM of the detection signal $S_d$. The detection signal threshold $AM_{th}$ is switchable, and the activation detection determiner 13 switches the detection signal threshold $AM_{th}$ from a first detection signal threshold $AM_{th1}$ to a second detection signal threshold $AM_{th2}$ that is greater than the first detection signal threshold ($AM_{th1} < AM_{th2}$).

Here, the first activation detection area A1 is the area within which the activation sensor 6 should normally perform detection, and the first detection signal threshold $AM_{th1}$ is selected accordingly. The second activation detection area A2 is within the first activation detection area A1, and preferably has a largest size of the area that does not overlap with the area B on the door track. The second detection signal threshold $AM_{th2}$ may be, for example, no greater than twice the first detection signal threshold $AM_{th1}$.

The activation detection area switcher 30 (FIG. 3) returns the activation detection area A to the first activation detection area A1 when a predetermined period has elapsed after the activation detection area A is switched from the first activation detection area A1 to the second activation detection area A2. This predetermined period is set to a time during which the door transitions from an open position to a closed position, determined based on the speed of the automatic door 3, or a time that is slightly longer than that time.

An operation of the automatic door sensor device according to the present embodiment will be described with reference to the flowchart in FIG. 6.

Figure 5:
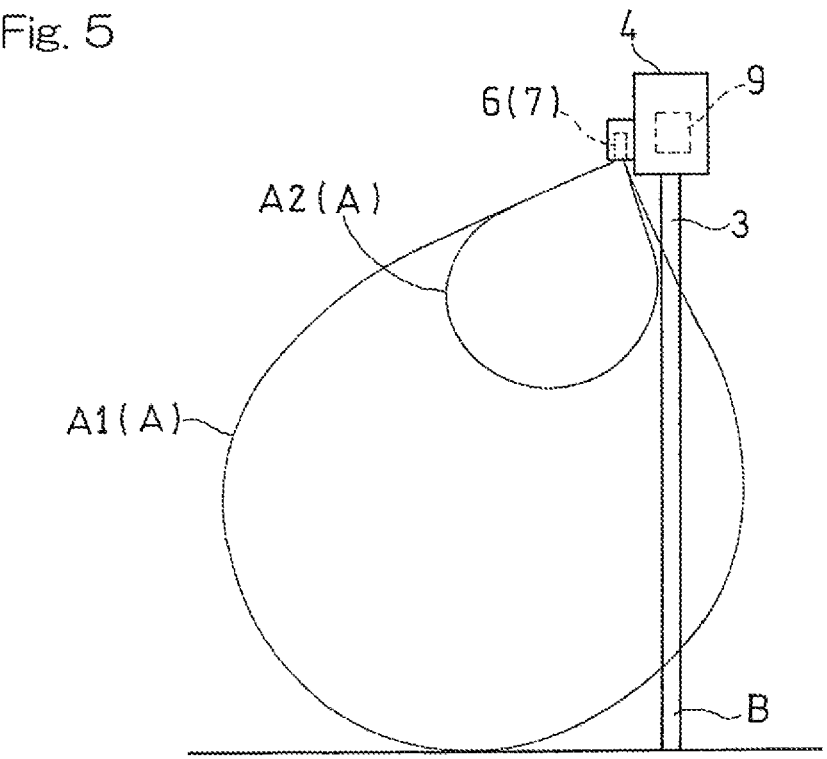
FIG. 5 is a side view showing the automatic door sensor device in FIG. 1 and first and second activation detection areas of the activation sensor thereof.

First, the activation detection area A in FIG. 5 is set to the first activation detection area A1. In particular, the orientation of the activation detection area A is adjusted by the microwave angle adjuster (not shown) at the time of attachment of the automatic door sensor device 1, and the detection signal threshold $AM_{th}$ is set to the first detection signal threshold $AM_{th1}$ ($AM_{th}=AM_{th1}$) so that the activation detection area A is set to the first activation detection area A1.

The safety sensor 7 and the activation sensor 6 determine whether the automatic door 3 is transitioning from an open position to a closed position. Specifically, first, a condition determiner (not shown) in the processing circuit 8 in FIG. 3 determines whether the predetermined condition has occurred, or in other words, it is determined whether a condition has occurred where the activation sensor 6 in FIG. 2 does not detect the movement of an object in the activation detection area A and the safety sensor 7 does not detect the presence of an object in the safety detection area C at the same time (step S1 in FIG. 6). It is therefore determined whether the condition has occurred that can always occur immediately before the automatic door 3 transitions from an open position to a closed position.

Figure 6:
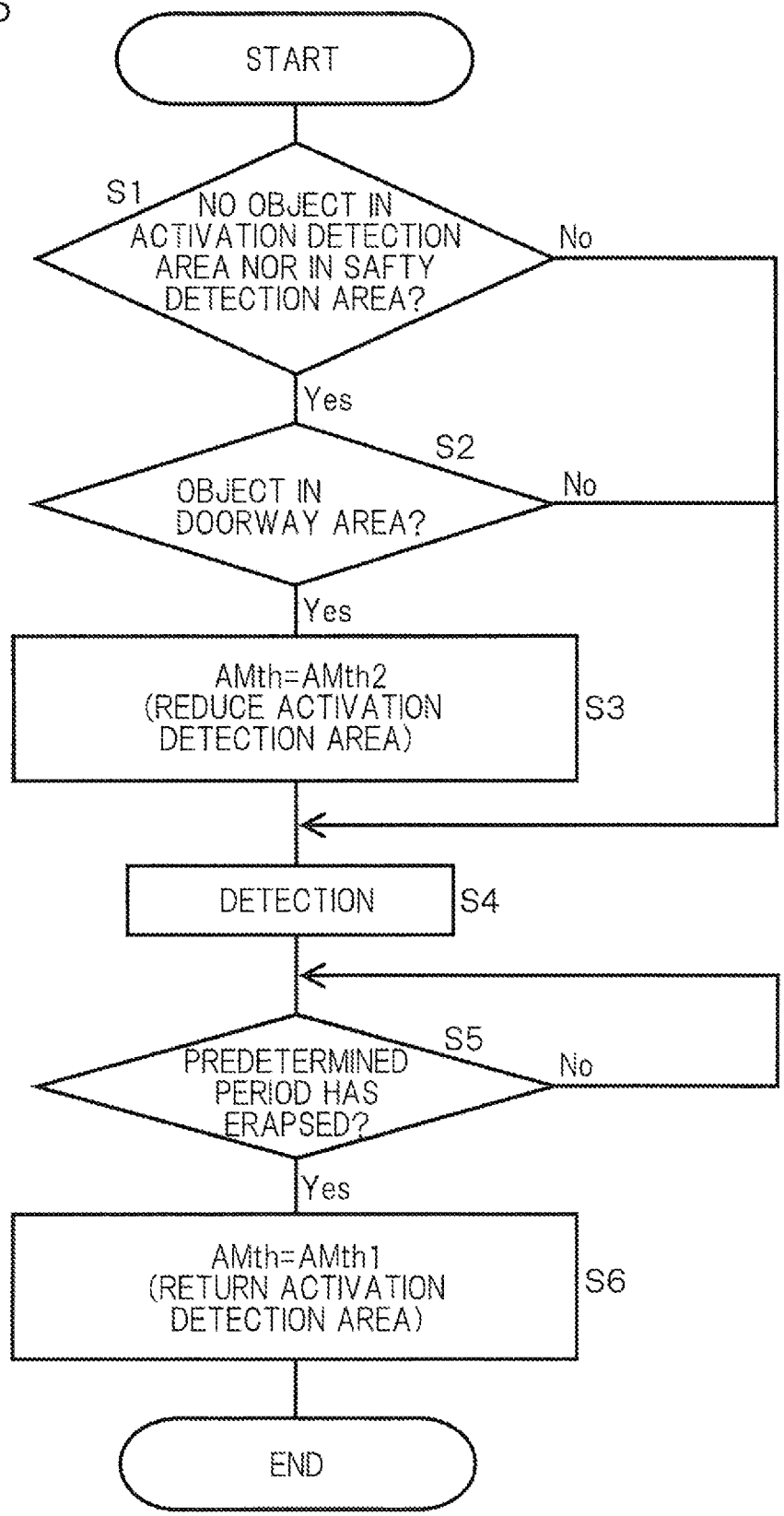
FIG. 6 is a flowchart illustrating an operation of the automatic door sensor device in FIG. 3.

If it is determined that the predetermined condition has occurred ("Yes" at step S1 in FIG. 6), the doorway area determiner 24 then determines whether the doorway area sensor portion 7a of the safety sensor 7 in FIG. 3 has detected an object in the doorway area C1 (FIG. 2) (step S2 in FIG. 6). Specifically, if the amount of light received by the beam receiver elements 22 that receive the reflected light from the doorway area C1 (FIG. 2) is greater than the amount of light received when the automatic door 3 (FIG. 2) is in an open position, it is determined that an object in the doorway area C1 (FIG. 2) has been detected. This determination enables the activation detection area switcher 30 to determine whether the automatic door 3 is transitioning from an open position to a closed position.

If it is determined that the doorway area sensor portion 7a of the safety sensor 7 has detected an object in the doorway area C1 (FIG. 2) ("Yes" at step S2 in FIG. 6), the activation detection area switcher 30 sets the second detection signal threshold $AM_{th2}$ as the switchable detection signal threshold $AM_{th}$ ($AM_{th}=AM_{th2}$). In particular, the activation detection area switcher 30 switches the activation detection area A in FIG. 5 from the first activation detection area A1 to the second activation detection area A2 by switching the detection signal threshold $AM_{th}$ from the first detection signal threshold $AM_{th1}$ to the second detection signal threshold $AM_{th2}$ (step S3 in FIG. 6).

After the activation detection area A in FIG. 2 has been switched to the activation detection area A2 (FIG. 5) that does not include the area B on the door track in this manner, a detection process (step S4 in FIG. 6) for opening the door 3 is executed. In the detection process, upon detection of the movement of an object in the activation detection area A, the activation sensor 6 determines that the object is approaching the automatic door 3, and outputs an instruction signal to the controller 9 that is necessary to open the automatic door 3. Upon detection of the presence of an object in the safety detection area C that includes the doorway area C1 which includes at least a portion of the area B defined by the path of the door, the safety sensor 7 determines that an object is present in the vicinity of the automatic door, and outputs an instruction signal to the controller 9 that is necessary to open the automatic door 3 in order to prevent the object from being jammed in the automatic door 3. Here, since the activation detection area A has been switched to the activation detection area A2 (FIG. 5), the closing door 3 will not be erroneously detected as the movement of an object.

In the case of a condition other than the predetermined condition, or in other words, when the activation sensor 6 or the safety sensor 7 detects an object ("No" at step S1 in FIG. 6), this is determined not to be the condition occurring before the automatic door 3 transitions from an open position to a closed position. Accordingly, the detection process (step S4 in FIG. 6) is then executed without switching the activation detection area A. Further, even if neither the activation sensor 6 nor the safety sensor 7 detects an object ("Yes" at step S1 in FIG. 6), as long as the doorway area sensor portion 7a of the safety sensor 7 subsequently does not detect an object in the doorway area C1 ("No" at step S2 in FIG. 6), the automatic door 3 is determined not to be transitioning from an open position to a closed position. Accordingly, the detection process (step S4 in FIG. 6) is then executed without switching the activation detection area A.

When a predetermined period has elapsed after the detection process (step S5 in FIG. 6), or in other words, after the automatic door 3 has transitioned to a closed position, the activation detection area switcher 30 (FIG. 3) sets the first detection signal threshold $AM_{th1}$ as the switchable detection signal threshold $AM_{th}$ ($AM_{th}=AM_{th1}$), thereby returning the activation detection area A of the activation sensor 6 from the second activation detection area A2 to the first activation detection area A1 if the second activation detection area A2 has been set to as the activation area A. Accordingly, when the automatic door 3 has transitioned to a closed position, the activation detection area A is set to the normal activation detection area A1.

As described thus far, with the automatic door sensor device according to the present embodiment, it is possible to prevent the activation sensor 6 from erroneously detecting the door 3 transitioning from an open position to a closed position as the movement of an object, despite the fact that the activation detection area A of the activation sensor 6 is allowed to be close to or overlap with the area B on the door track.

An automatic door sensor device according to a second embodiment of the present invention will be described. It should be noted that components in the present embodiment that are common to those in the first embodiment are denoted by the same reference numerals, and the description thereof will be omitted.

As with the automatic door sensor device 1 according to the first embodiment shown in FIGS. 1 and 2, an automatic door sensor device 1A according to the second embodiment is attached to one or both of the inner-side face and the outer-side face of a transom (support member) 4. Although the automatic door sensor 1A of the present embodiment also includes an activation sensor 6 and a safety sensor 7A as in the first embodiment, the safety sensor 7A has a configuration different from that in the first embodiment as will be described below.

Figure 7:
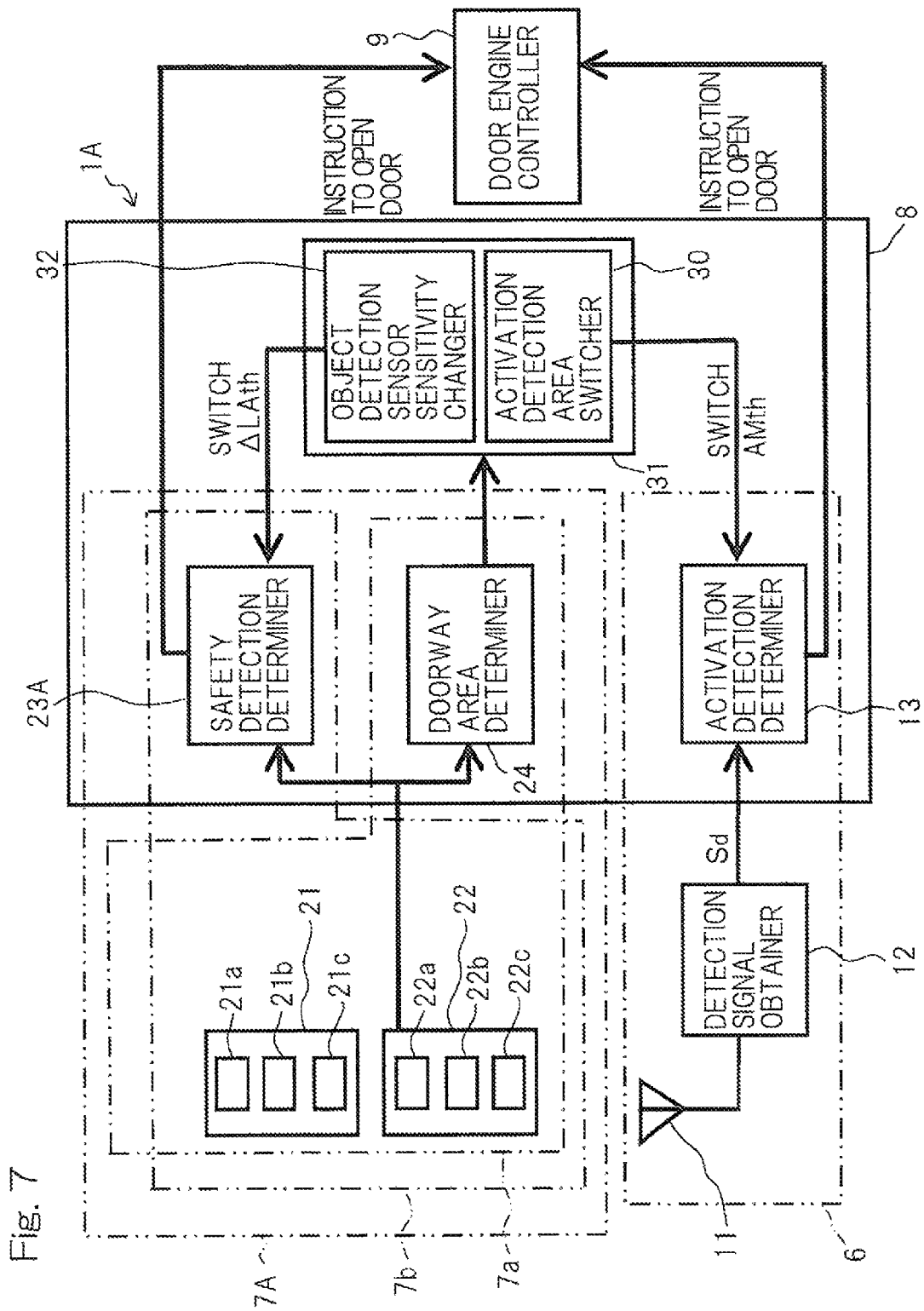
FIG. 7 is a schematic block diagram of the automatic door sensor device according to the second embodiment of the present invention.

As shown in FIG. 7, the safety sensor 7A of the automatic door sensor device 1A is also provided with a plurality of beam projector elements 21 (in the present embodiment as well, first to third beam projector elements 21a, 21b, and 21c) that project light beam downward, and a plurality of beam receiver elements 22 (in the present embodiment as well, first to third beam receiver elements 22a, 22b, and 22c) that receive reflected light travelling from below as in the first embodiment. The safety sensor 7A detects an object in the safety detection area C shown in FIG. 2 (in the present embodiment as well, a group of first to third safety detection area portions C1, C2, and C3) by using the beam projector elements 21 and the beam receiver elements 22 as a whole. In the present embodiment as well, the doorway area sensor portion 7a detects an object in the doorway area C1 which includes at least a portion of the area B defined by the path of the door. On the other hand, a sensor portion that detects an object in an object detection area composed of the safety detection area portions C2 and C3 of the safety detection area C, excluding the doorway area C1, functions as an object detection sensor 7b. In the present embodiment, the object detection sensor 7b and the activation sensor 6 function as a detector.

The safety detection determiner 23A of the safety sensor 7A determines that an object is detected in the safety detection area C (FIG. 2), based on the amount of light received by the beam receiver elements 22 (22a, 22b, and 22c). A received light amount change threshold $\Delta LA_{th}$ used to determine that an object is detected will be described later.

The automatic door sensor device 1A of the present embodiment includes a detection area changer 31 in the processing circuit 8. The detection area changer 31 includes the activation detection area switcher 30, which have been described in the first embodiment, and an object detection sensor sensitivity changer 32. When it is detected, by using the doorway area sensor portion 7a of the safety sensor 7A, that the automatic door 3 in FIG. 2 is transitioning from an open position to a closed position, the detection area including the activation detection area A and the object detection area composed of the safety detection area portions C2 and C3 are changed.

Specifically, when it is recognized that the automatic door 3 is transitioning from an open position to a closed position, the activation detection area switcher 30 of the detection area changer 31 in FIG. 7 switches the activation detection area A (FIG. 5) from the first activation detection area A1 (FIG. 5) to the second activation detection area A2 (FIG. 5) as described in the first embodiment, and the object detection sensor sensitivity changer 32 decreases the detection sensitivity of the object detection sensor 7b.

The movement of the automatic door 3 in FIG. 2 causes the transom 4 supporting the automatic door 3 to sway, resulting in fluctuation of in the safety detection area C (FIG. 2) of the safety sensor 7A and hence fluctuation of the amount of light received by the beam receiver elements 22 of the safety sensor 7A. To prevent the object detection sensor 7b from determining that an object is present in the detection area portions C2 or C3 (FIG. 2), the detection sensitivity is decreased. It should be noted that the detection sensitivity of the doorway area sensor 7a that detects an object in the doorway area C1 (FIG. 2) is not decreased since the movement of the automatic door 3 need to be detected and it is necessary to prevent an object from being jammed by the automatic door 3.

Specifically, the detection sensitivity is decreased by the object detection sensor sensitivity changer 32 in FIG. 7 switching the received light amount change threshold $\Delta LA_{th}$ used by the safety detection determiner 23A for the safety detection area portions C2 and C3 (FIG. 2) from a first received light amount change threshold $\Delta LA_{th1}$ to a second received light amount change threshold $\Delta LA_{th2}$ that is greater than the first received light amount change threshold $\Delta LA_{th1}$ ($\Delta LA_{th1} < \Delta LA_{th2}$). Here, the received light amount change threshold $\Delta LA_{th}$ is a threshold for difference with respect to the amount of light received by the beam receiver element 22 in the case where no object is present in the safety detection area portions C2 nor C3 (FIG. 2) and where the safety sensor 7A is stationary without swaying of the transom 4 (FIG. 2). If an increase or decrease of the received light amount exceeds the threshold $\Delta LA_{th}$, the safety detection determiner 23A determines that an object is present in the safety detection area portions C2 and/or C3 (FIG. 2).

Thus, in the present embodiment, erroneous detection is prevented even though detection of an object is temporarily made to be difficult as a result of the safety detection determiner 23A decreasing the detection sensitivity of the object detection sensor 7b for the safety detection area portions C2 and C3 (FIG. 2).

It should be noted that the first threshold $\Delta LA_{th1}$ is small enough to enable detection of an object such as a human body in the safety detection area portions C2 and C3 (FIG. 2) while the second threshold $\Delta LA_{th2}$ is large enough to prevent detection of the change in the received light amount that results from the swaying of the transom 4 (FIG. 2) caused by movement of the automatic door 3 (FIG. 2).

The first and second thresholds $\Delta LA_{th1}$ and $\Delta LA_{th2}$ of the received light amount change threshold $\Delta LA$ may have different values for each of the safety detection area portions C2 and C3 (FIG. 2).

The detection area changer 31 switches the activation detection area A in FIG. 5 from the first activation detection area A1 to the second activation detection area A2, and at the same time, decreases the detection sensitivity of the object detection sensor 7b (FIG. 7) for the safety detection area portions C2 and C3 (FIG. 2). When the predetermined period has elapsed thereafter, the detection area changer 31 returns the detection area A to the first activation detection area A1, and also returns the detection sensitivity of the object detection sensor 7b (FIG. 7) to the value before the change.

An operation of the automatic door sensor device according to the present embodiment will be described with reference to the flowchart in FIG. 8.

As in the first embodiment, the activation detection area A (FIG. 5) is initially set to the first activation detection area A1 (FIG. 5) and the detection sensitivity of the object detection sensor 7b in FIG. 7 is set to the normal detection sensitivity. In other words, $AM_{th} = AM_{th1}$ and $\Delta LA_{th} = \Delta LA_{th1}$ are satisfied.

At steps S1 and S2 (FIG. 8), whether the automatic door 3 (FIG. 2) is transitioning from an open position to a closed position is determined.

Figure 8:
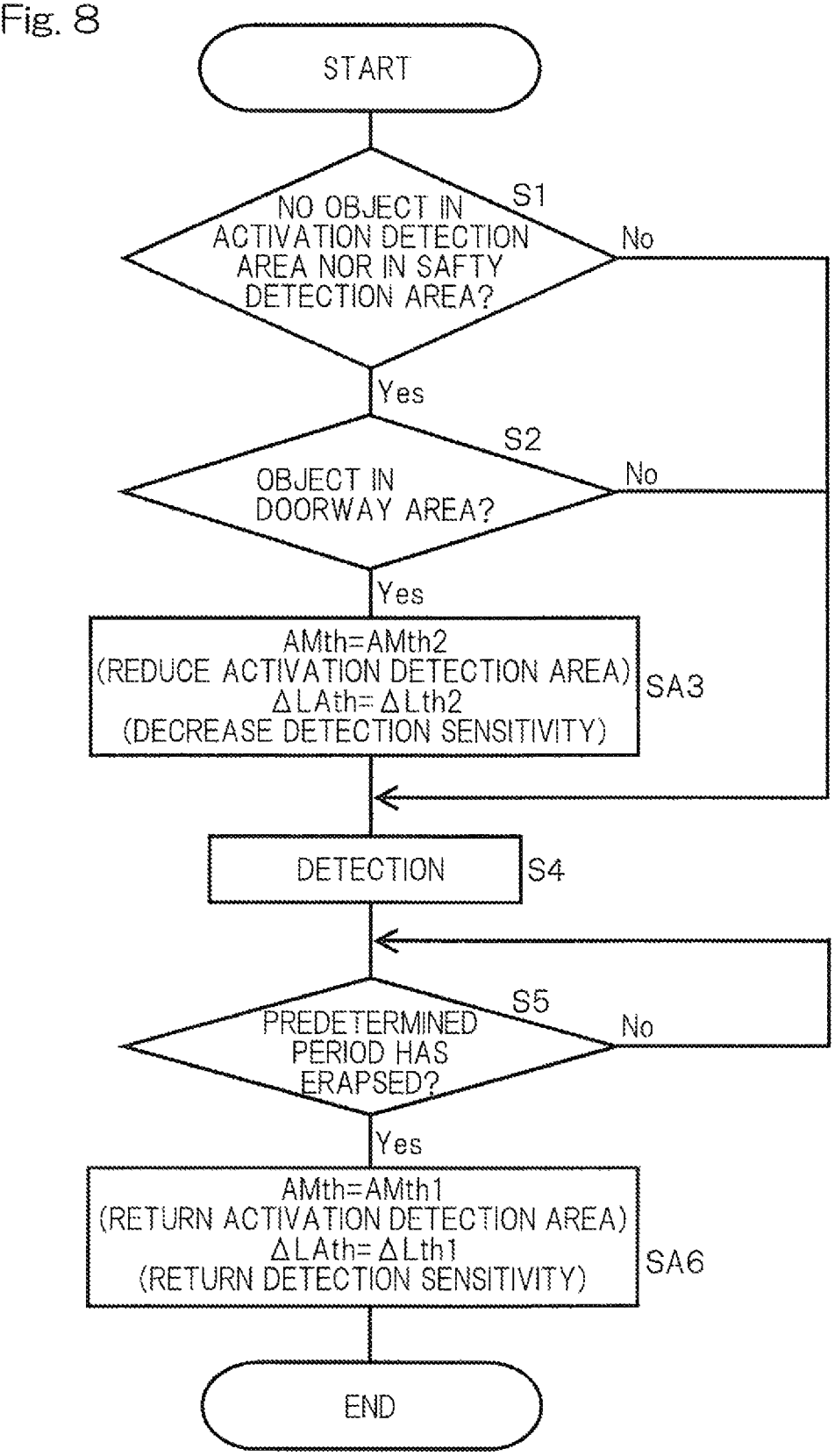
FIG. 8 is a flowchart illustrating an operation of the automatic door sensor device in FIG. 7.

If it is determined that the doorway area sensor portion 7a of the safety sensor 7A has detected an object in the doorway area C1 (FIG. 2) ("Yes" at step S2 in FIG. 8), the activation detection area switcher 30 reduces the activation detection area A (FIG. 5) by setting the second detection signal threshold $AM_{th2}$ as the switchable detection signal threshold $AM_{th}$ ($AM_{th} = AM_{th2}$), and the object detection sensor sensitivity changer 32 decreases the detection sensitivity of the object detection sensor 7b by setting the second received light amount change threshold $\Delta LA_{th2}$ as the received light amount change threshold $\Delta LA_{th}$ ($\Delta LA_{th} = \Delta LA_{th2}$) (step SA3 in FIG. 8). Thereafter, the detection process (step S4 in FIG. 8) is executed.

When the predetermined period has elapsed after the detection process (step S5 in FIG. 8), or in other words, after the automatic door 3 has transitioned to a closed position, the activation detection area switcher 30 returns the activation detection area A to the first activation detection area A1 by setting the first detection signal threshold $AM_{th1}$ as the switchable detection signal threshold $AM_{th}$ ($AM_{th} = AM_{th1}$) if $AM_{th} = AM_{th2}$, and the detection area changer 31 (FIG. 3) returns the detection sensitivity of the object detection sensor 7b to the normal sensitivity by setting the first received light amount change threshold $\Delta LA_{th1}$ as the received light amount change threshold $\Delta LA_{th}$ of the object detection sensor 7b ($\Delta LA_{th} = \Delta LA_{th1}$) if $\Delta LA_{th} = \Delta LA_{th2}$. When the automatic door 3 has turned into a closed position in this manner, the activation detection area A is returned to the normal activation detection area A1, and the detection sensitivity of the object detection sensor 7b is also returned to the normal sensitivity.

As described thus far, with the automatic door sensor device according to the present embodiment, it is possible to prevent erroneous detection of the door 3 transitioning from an open position to a closed position as an object, despite the fact that normally the activation detection area A of the activation sensor 6 is allowed to be defined so as to be close to or overlap with the area B on the door track and that the detection sensitivity of the object detection sensor 7b is sufficiently large.

Although the second moving object detection area (second activation detection area) A2 is within the first moving object detection area (first activation detection area) A1 in the embodiments described above, the present invention is not limited thereto as long as the second moving object detection area A2 is different from the first moving object detection area A1. More specifically, the second moving object detection area A2 may partly overlap with the first moving object detection area A1.

Although the moving object detection area changer (activation detection area switcher) 30 switches the moving object detection area (activation detection area) A between two areas, namely, the first moving object detection area (first activation detection area) A1 and the second moving object detection area (second activation detection area) A2 in the embodiments described above, the moving object detection area (activation detection area) A may be gradually changed between the first moving object detection area A1 and the second moving object detection area (second activation detection area) A2.

Although the activation sensor 6 is constituted by a microwave sensor that uses the Doppler effect in the embodiments described above, it may be any sensor capable of detecting the movement of an object in the activation detection area. For example, it is possible to employ an active infrared (AIR) sensor, an image sensor, a passive infrared (PIR) sensor, or a microwave sensor of a standing wave radar system.

Although the safety sensor 7 includes three beam projector elements 21 and three beam receiver elements 22, the safety sensor 7 may include any number of these elements. Although the safety sensor 7 is constituted by an active infrared (AIR) sensor, it may be any sensor capable of detecting an object in the doorway area. For example, it is possible to employ an image sensor or a microwave sensor of a standing wave radar system.

The detector is constituted by the activation sensor 6 in the first embodiment, and the detector is composed of the activation sensor 6 and the object detection sensor 7b in the second embodiment. Alternatively, however, the detector may be constituted only by the object detection sensor 7b. In that case, the detection area changer 31 includes only the sensor sensitivity changer 32. Accordingly, the detection area changed by the detection area changer 31 is composed only of the safety detection area portions C2 and C3, and the moving object detection area A remains to be the first moving object detection area A1 without being changed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1 (1A): automatic door sensor device
3: door
4: support member
6, 7b: detector
7a: doorway area sensor
31: detection area changer
B: area on door track
C1: doorway area
A, C2, C3: detection area

What is claimed is:

1. An automatic door sensor device that is supported by a support member and detects an object to control opening and closing of a door, the device comprising:
a doorway area sensor to detect presence of an object in a doorway area which includes at least a portion of an area defined by a path of the door;
a detector to detect presence or movement of an object in a changeable detection area; and
a detection area changer to change the detection area when a determination is made, by using the doorway area sensor, that the door is transitioning from an open position to a closed position,
wherein the detector includes a moving object sensor that detects movement of an object in a moving object detection area, and
wherein the detection area changer includes a moving object detection area changer that changes the moving object detection area from a first moving object detection area to a second moving object detection area that is different from the first moving object detection area when the determination is made that the door is transitioning from the open position to the closed position, the first moving object detection area being allowed to be defined so as to overlap with the area on the path of the door, and the second moving object detection area being defined so as not to overlap with the area on the path of the door.

2. The automatic door sensor device as claimed in claim 1, wherein the moving object sensor includes a moving object detection determiner to compare a magnitude of a detection signal with a changeable detection signal threshold, and determines movement of an object in the moving object detection area if the magnitude of the detection signal exceeds the changeable detection signal threshold, the moving object detection area of the moving object sensor being dependent on the changeable detection signal threshold, and
wherein the moving object detection area changer changes the moving object detection area from the first moving object detection area to the second moving object detection area by switching the changeable detection signal threshold from a first detection signal threshold to a second detection signal threshold that is greater than the first detection signal threshold.

3. The automatic door sensor device as claimed in claim 2, wherein the moving object sensor further includes:
an emitter to emit a radiation wave;
a receiver to receive a reflected wave from the object irradiated with the radiation wave emitted by the emitter; and
a detection signal obtainer to obtain the detection signal from the radiation wave emitted by the emitter and the reflected wave received by the receiver.

4. The automatic door sensor device as claimed in claim 1, wherein the moving object sensor includes a microwave sensor that uses Doppler effect.

5. The automatic door sensor device as claimed in claim 1, wherein the detector includes an object detection sensor that detects presence of an object in an object detection area, the object detection sensor being mounted on the support member, and
wherein the detection area changer includes an object detection sensor sensitivity changer that changes the object detection area by decreasing a sensitivity of the object detection sensor when the determination is made that the door is transitioning from the open position to the closed position.

6. The automatic door sensor device as claimed in claim 5, wherein the object detection sensor includes an infrared sensor, and the object detection area is defined in a vicinity of the door.

7. The automatic door sensor device as claimed in claim 1, wherein, when a predetermined period has elapsed after the detection area is changed upon determination that the door is transitioning from the open position to the closed position, the detection area changer returns the changeable detection area to the detection area before the change.

8. The automatic door sensor device as claimed in claim 1, wherein the determination is made that the door is transitioning from the open position to the closed position when the doorway area sensor detects presence of an object in the doorway area after a predetermined condition has occurred.

* * * * *